United States Patent [19]
Ogata

[11] Patent Number: 5,353,160
[45] Date of Patent: * Oct. 4, 1994

[54] THREE-UNIT COMPACT ZOOM LENS SYSTEM

[75] Inventor: Yasuji Ogata, Tokyo, Japan

[73] Assignee: Olympus Optical Co., Ltd., Tokyo, Japan

[*] Notice: The portion of the term of this patent subsequent to Jun. 1, 2010 has been disclaimed.

[21] Appl. No.: 917,999

[22] Filed: Jul. 24, 1992

[30] Foreign Application Priority Data

Jul. 24, 1991 [JP] Japan .................. 3-182751

[51] Int. Cl.$^5$ .................. G02B 15/14; G02B 13/18
[52] U.S. Cl. .................. 359/689; 359/714; 359/715
[58] Field of Search .................. 359/689, 692, 714, 715

[56] References Cited

U.S. PATENT DOCUMENTS

| | | | |
|---|---|---|---|
| 4,726,668 | 2/1988 | Nakayama et al. | 359/689 |
| 4,815,830 | 3/1989 | Sato et al. | 359/692 |
| 5,069,536 | 12/1991 | Ogata | 359/689 |
| 5,071,235 | 12/1991 | Mori et al. | 359/692 |
| 5,216,547 | 6/1993 | Ogata | 359/689 |

FOREIGN PATENT DOCUMENTS

60-48009 3/1985 Japan .
1307714 12/1989 Japan .
26917 1/1990 Japan .

Primary Examiner—Scott J. Sugarman
Attorney, Agent, or Firm—Cushman, Darby & Cushman

[57] ABSTRACT

The present invention provides a three-unit zoom lens system comprising, in order from the object side, a first lens unit G1 consisting of a negative meniscus lens convex on the object side and a positive meniscus lens convex on the object side and having a positive refracting power as a whole, a second lens unit G2 consisting of one positive lens, or one negative lens and one positive lens, and having a positive refracting power as a whole and a third lens unit G3 consisting of one negative lens, said first and second lens units being movable toward each other for zooming from the wide to tele position. This compact zoom lens system comprises 4 or 5 lenses and is of sufficient performance in terms of a zoom ratio of 1.5 to 2.

22 Claims, 8 Drawing Sheets

THREE-UNIT COMPACT ZOOM LENS SYSTEM

The present invention relates generally to a zoom lens system having a zoom ratio of ca. 1.5 to 2, which is best suited for lens shutter cameras, etc., and more particularly to a three-unit compact zoom lens system which consists of a reduced number of lenses and so is inexpensive.

In recent years, a zooming type of lens shutter cameras have been generally popular, and various proposals have been made as to those having zoom ratios of 1.5 to 3.0 or more. However, they are still larger in size and costlier than monofocus cameras; that is, much is left about their size and cost.

In order to meet such needs, Applicant has already come up with zoom lens systems consisting of a reduced number of lenses (see, for instance, Japanese Patent Application Nos. Hei. 2-190170 and 3-22218). All these are directed to a three-unit or positive/positive/negative-unit zoom type of systems; Japanese Patent Application No. Hei. 2-190179 achieves a zoom ratio of 2 with 6 or 7 lens components, while Japanese Patent Application No. Hei. 3-22218 a zoom ratio of 1.6 with as small as 4 lenses.

Some examples of a two-unit or positive/negative-unit zoom lens system are set forth in Japanese Provisional Patent Publication Nos. Sho. 60-48009, Hei. 1-307714 and Hei. 2-2917. All these achieve a zoom ratio of about 1.5 with about 4 lens components.

However, the zoom lens system disclosed in Japanese Provisional Patent Publication No. Hei. 2-190170 is well enough in terms of optical performance, but consists of a large number of lenses. On the contrary, the rest of the prior art mentioned above are poor in optical performance and so practically less than satisfactory, albeit reduced in the number of the lenses used. The zoom lens system referred to in Japanese Patent Application No. Hei. 3-22218 is unpreferred in terms of cost, because costly glass having a high Abbe's number is used for it.

SUMMARY OF THE INVENTION

In view of the disadvantages of the prior art mentioned above, a main object of this invention is to provide a three-unit or positive-positive-negative unit zoom lens system which consists of 4 to 5 lenses but is nonetheless well enough in terms of performance, e.g., has a zoom ratio of 1.5 to 2.

More specifically, the three-unit compact zoom lens system of this invention comprises, in order from the object side, a first lens unit consisting of a negative meniscus lens convex on the object side and a positive meniscus lens convex on the object side and having a positive refracting power as a whole, a second lens unit consisting of one positive lens or one negative lens and one positive lens and having a positive refracting power as a whole and a third lens unit consisting of one negative lens, said first and second lens units being movable toward each other for zooming from the wide to tele position.

In a preferable embodiment of this invention, an aspherical surface is incorporated in said second or third lens unit.

In another preferable embodiment of this invention, the following conditions (1) and (2) are satisfied:

$$0.5 < |f_3/f_W| < 1.2, \quad (1) \text{ and}$$

$$1.2 < \beta_{3W} < 1.8. \quad (2)$$

Here
$f_W$ is the focal length of the total system at the wide position,
$f_3$ is the focal length of said third lens unit, and
$\beta_{3W}$ is the image-formation magnification of said third lens unit at the wide position.

Alternatively, it is desired that the following condition (3) is satisfied:

$$0.5 < f_2/f_W < 1.3. \quad (3)$$

Here
$f_W$ is the focal length of the total system at the wide position, and
$f_2$ is the focal length of said second lens unit.

Still alternatively, it is desired that the following conditions (4) and (5) are satisfied:

$$0.7 < (r_1 + r_b)/(r_a - r_b) < 3, \quad (4) \text{ and}$$

$$0.12 < L/f_W < 0.3. \quad (5)$$

Here
$r_a$ and $r_b$ are the object- and image-side radii of curvature of the positive lens in said second lens unit, respectively, and
$L$ is the distance of said second lens from the stop to the object side of the positive lens.

In the zoom lens system of this invention, the first and second units, because of being proximate to each other at the wide position, forms a so-called telephoto type lens system with the third unit. Thus, it is possible to reduce the overall length of the overall lens system by increasing the composite power of the first and second units and the power of the third unit. Set for achieving this are the conditional formulae (1) and (2).

If the power of the third unit is weaker than the upper limit of Formula (1), then the telephoto type action becomes too weak to make it difficult to reduce the total lens length; in other words, the total lens length is too long. Falling short of the lower limit may be preferred for reducing the total lens length, but makes the power of the third unit too strong, rendering it difficult to correct aberration variations, esp., the curvature of field.

Formula (2) is the condition concerning the image-formation magnification of the third unit. Now let $f_{12W}$ denote the composite focal length of the first and second units at the wide position, then $fW = f_{12W} \cdot \beta_{3W}$; that is, Formula (2) defines the composite power of the first and second units as well. Reducing the total lens length alone, for instance, may be easily achieved by bringing the back focus close to zero. However, this is unpreferred for making the camera body compact, because the third unit is located so closely to the image surface that the diameter of the lens increases as a matter of course. In other words, unless any enough back focus is secured even when the total lens length is reduced, making the camera body compact will be insignificant. Now let $f_{BW}$ denote the back focus at the wide position, then $f_{BW} = f_3(1 - \beta_{3W})$; that is, the larger the value of $\beta_{3W}$ with respect to $f_3$ determined by Formula (1), the larger the back focus and so the smaller the lens diameter of the third unit. The magnification of the third unit exceeding than the upper limit of Formula (2) may be favorable for the total lens length and back focus, but causes the composite power of the first and second units to become too strong, making correction of aberration variations difficult. When the magnification of the third unit is below the lower limit of Formula (2), on the other hand, it is impossible to attain the goal of making the zoom lens system compact.

As mentioned above, making the zoom lens system compact at the wide position may be achieved by conforming to Formulae (1) and (2). However, if there is an increase in the amount of unit movement, then it is impossible to reduce the thickness of the camera body. Consequently, the amount of unit movement must be reduced as well, so as to make the zoom lens system compact. To this end, Formula (3) has to be satisfied.

Exceeding the upper limit of Formula (3) is undesired for making the zoom lens system compact, because there is an increase in the amount of unit movement. Falling short of the lower limit may be preferred for making the zoom lens system—because the power of the second unit is increased, but makes correction of aberration variations difficult.

Making the zoom lens system compact may be achieved by satisfying the formulae (1), (2) and (3) mentioned above. More preferably or in order to make the length of each unit as short as possible and correct aberrations well with the minimum number of lenses, however, the lens arrangement of each unit should be designed as follows.

As the number of lenses decreases, correction of chromatic aberration becomes more difficult. In particular, a problem arises in connection with the chromatic aberration of magnification. For instance, if the first unit is constructed from one positive lens, as set forth in Japanese Patent Application No. Hei. 3-22218, then extreme overcorrection of the chromatic aberration of magnification takes place; that is, even when use is made of glass having a high Abbe's number, satisfactory correction is unachievable. For this reason, it is required that the chromatic aberration of magnification occurring at the first unit be well corrected by allowing the first unit to comprise a combination of a negative lens and a positive lens.

Since the second unit comprises one positive lens or one negative lens and one positive lens and the third unit comprises one negative lens alone, it is required to incorporate an aspherical surface in each unit so as to correct spherical aberration, coma, etc. satisfactorily. In this case, the aspherical surface incorporated in the second unit is of such configuration that its positive power decreases gradually from the optical axis to the periphery. Likewise, the aspherical surface in the third unit is of such configuration that its negative power increases gradually.

In making correction of aberrations, correction of astigmatism becomes difficult. It is thus desired that the following conditional formulae (4) and (5) be met.

$$0.7 < (r_a + r_b)/(r_a - r_b) < 3, \quad (4)$$

and $$0.12 < L/f_W < 0.3. \quad (5)$$

Here $r_a$ and $r_b$ are the object- and image-side radii of curvature of the positive lens in said lens unit, respectively, and L is the distance of said second lens from the stop to the object side of the positive lens.

Below the lower limits of Formulae (4) and (5), astigmatism increases with undercorrection of the curvature of field. Above the upper limit of Formula (4) meniscus configuration prevails with the result that the spherical aberration gets worse. Exceeding the upper limit of Formula (5) gives rise to an increase in the length of the second unit and so is unpreferred for making the zoom lens system compact.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In what follows, some examples of the zoom lens system according to this invention will be explained more specifically.

Figure 1:
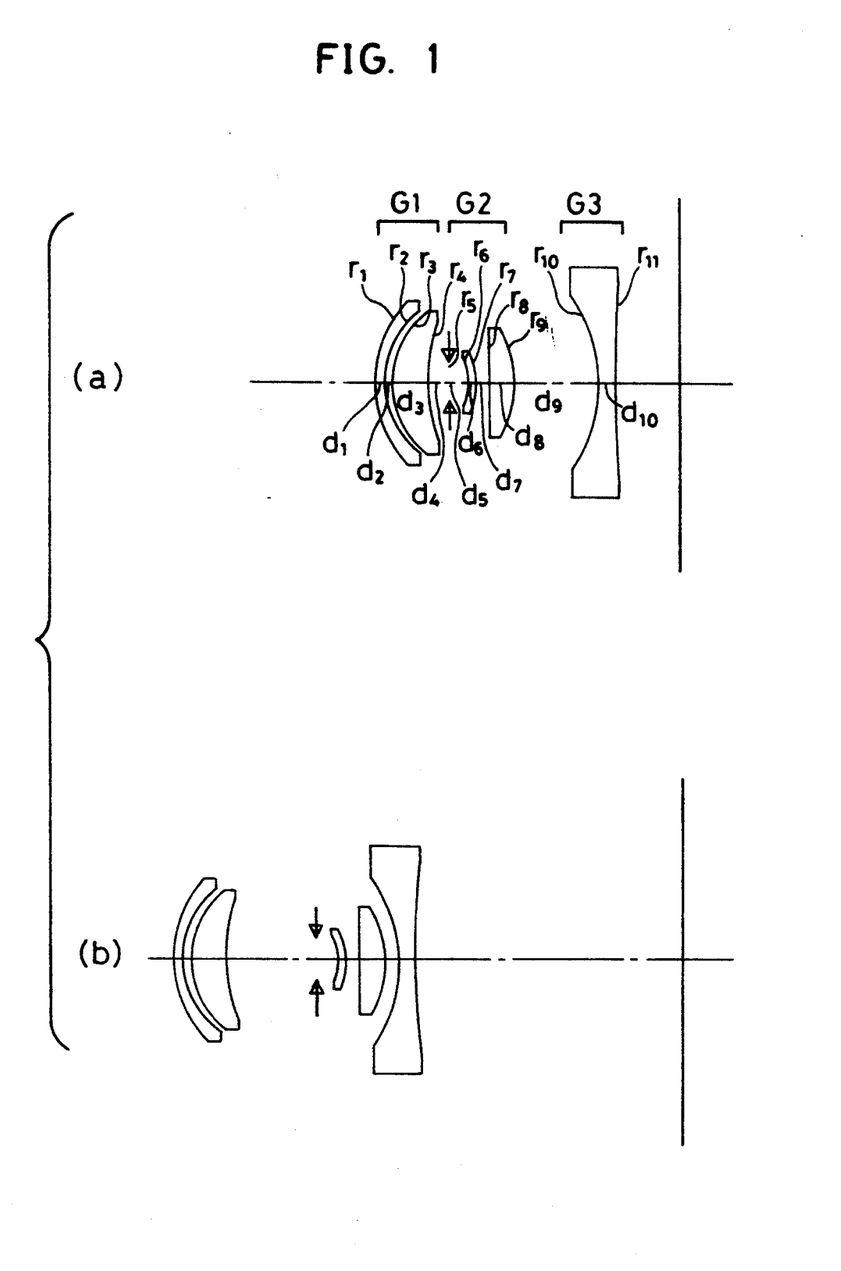
FIG. 1 represents in section the zoom lens system according to Example 1 of this invention at the wide and tele positions.
Figure 2:
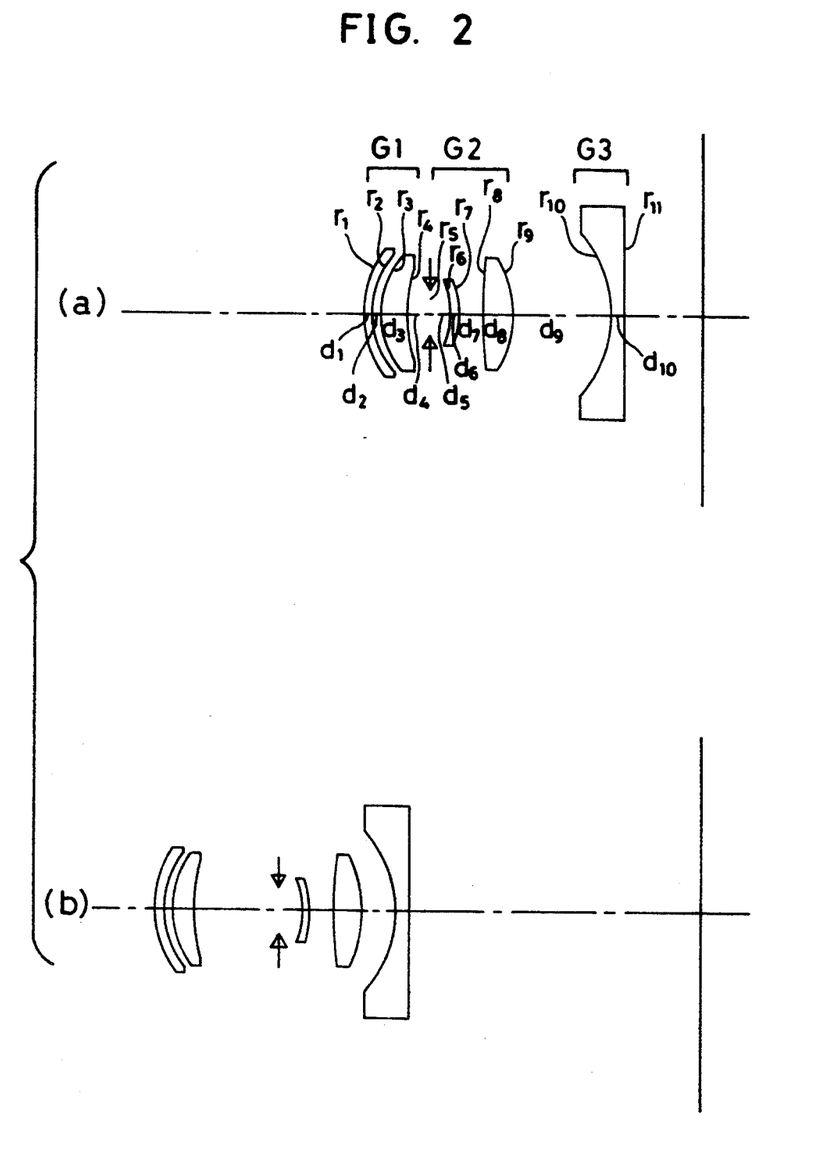
FIGS. 2, 3 and 4 represent in section the zoom lens systems according to Examples 2, 3 and 4 of this invention at the wide and tele positions.
Figure 3:
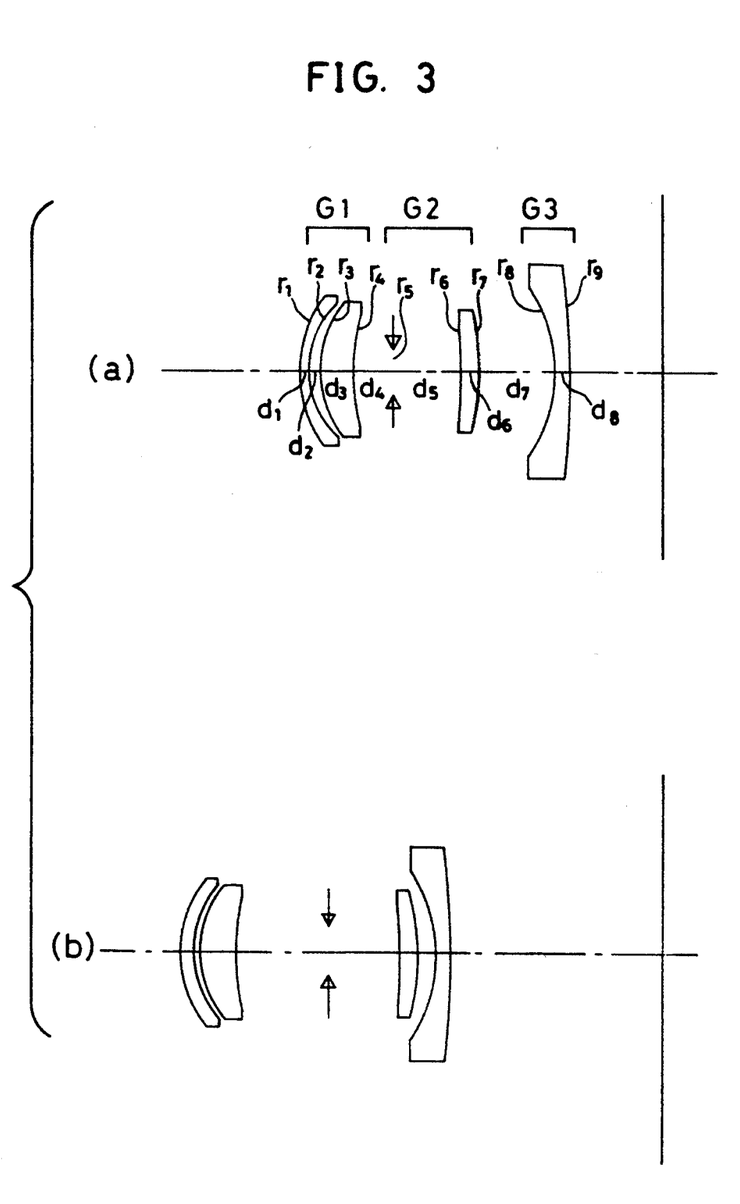
Figure 4:
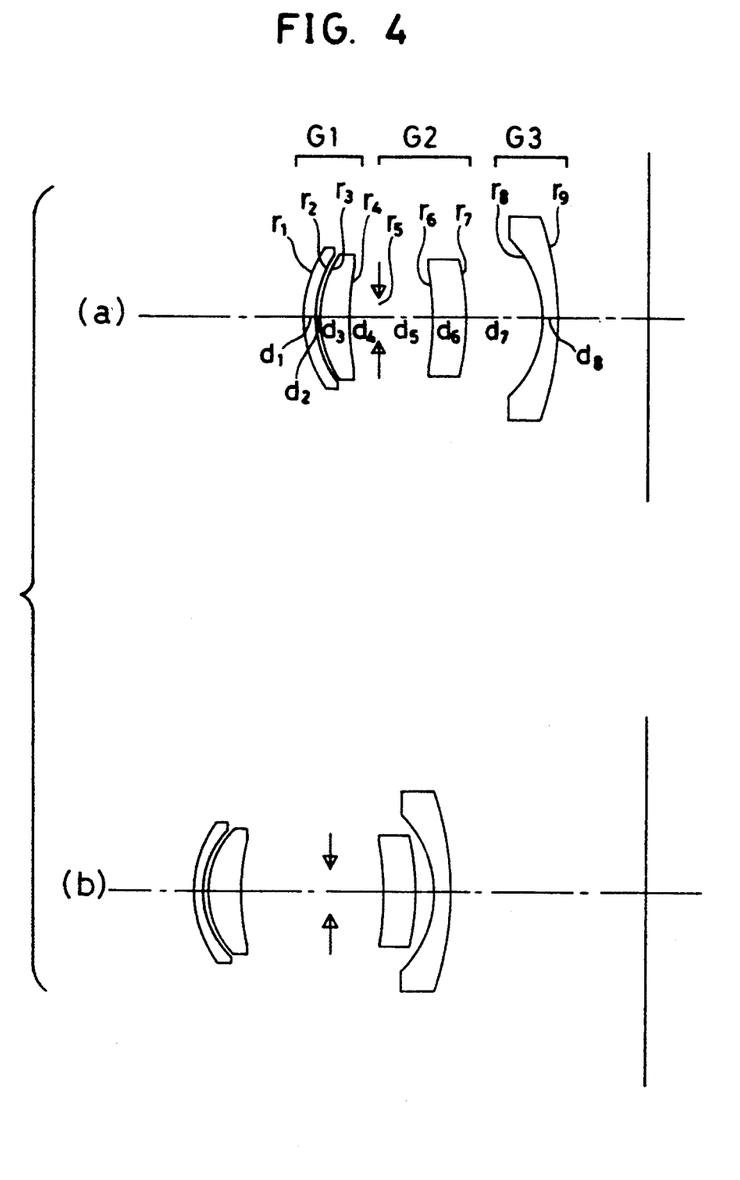

The sections of the lens arrangements of Examples 1–4 at the (a) wide, (b) standard and (c) tele positions are shown in FIGS. 1–4. Example 1 is directed to a zoom lens system comprising 5 lenses and having a focal length of 28–56 mm and a zoom ratio of 2, Example 2 to a zoom lens system comprising 5 lenses and having a focal length of 35–70 mm and a zoom ratio of 2, and Examples 3 and 4 each to a zoom lens system comprising 4 lenses and having a focal length of 40–60 mm and a zoom ratio of 1.5.

Referring then to the lens arrangement of each unit, first unit G1 comprises a negative meniscus lens convex on the object side and a positive meniscus lens convex on the object side—this is common to all the examples. The second unit G2 comprises in Example 1 a negative meniscus lens concave on the object side and a positive meniscus lens concave on the object side; in Example 2 a negative meniscus lens concave on the object side and a double-convex positive lens; and in Example 3 or 4 one positive meniscus lens concave on the object side. The third unit G3 comprises in Example 1 a double-concave negative lens; and in Example 2, 3 or 4, a negative meniscus lens concave on the object side.

Referring to aspherical configuration, two aspherical surfaces are applied, one to the image-side surface of the second unit G2 and another to object-side surface of the third unit G3 in Example 1 or 2; three are applied, one to the object-side surface of the positive meniscus lens of the first unit G1, one to the image-side surface of the second unit G2 and one to the object-side surface of the third unit G3 in Example 3; and three are applied, one to the object-side surface of the first unit G1, one to the image-side surface of the second unit G2 and one to the image-side surface of the third unit G3 in Example 4.

It is noted that in all the examples the first and third units G1 and G3 are movable together during zooming. It is noted, however, that in order to increase the degree of freedom in terms of aberration correction, they may be moved separately.

It is noted that the symbols used hereinafter but not referred to hereinbefore mean:

f: focal length of the total system
$F_{NO}$: F-number
$\omega$: half field angle
$f_B$: back focus
$r_1, r_2, \ldots$ : radii of curvature of the lens surfaces
$d_1, d_2, \ldots$ : separation between adjacent lenses surfaces
$n_{d1}, n_{d2}, \ldots$ : d-line refractive indices of the lenses
$\nu_{d1}, \nu_{d2}, \ldots$ : Abbe's number of the lenses Here let x denote the optical axis direction and y denote the direction normal to the optical axis, then aspherical configuration is expressed by the following formula:

$$x = (y^2/r)/[1+\{1-(y/r)^2\}^{\frac{1}{2}}] + A_4 y^4 + A_6 y^6 + A_8 y^8 + A_{10} y^{10},$$

provided that r is the radius of curvature on the optical axis and $A_4$, $A_6$, $A_8$ and $A_{10}$ are aspherical coefficients.

EXAMPLE 1

$f = 28 \sim 39.6 \sim 56$
$F_{NO} = 4.60 \sim 5.84 \sim 7.49$
$\omega = 37.7 \sim 28.6 \sim 21.1°$
$f_B = 7.60 \sim 17.64 \sim 31.33$

| | | | |
|---|---|---|---|
| $r_1 = 13.0950$ | $d_1 = 1.2000$ | $n_{d1} = 1.84666$ | $\nu_{d1} = 23.78$ |
| $r_2 = 10.8590$ | $d_2 = 0.8000$ | | |
| $r_3 = 10.7940$ | $d_3 = 4.2600$ | $n_{d2} = 1.48749$ | $\nu_{d2} = 70.20$ |
| $r_4 = 25.6040$ | $d_4 = $ (Variable) | | |
| $r_5 = \infty$ (Stop) | $d_5 = 1.8000$ | | |
| $r_6 = -6.5090$ | $d_6 = 1.0000$ | $n_{d3} = 1.80518$ | $\nu_{d3} = 25.43$ |
| $r_7 = -7.6530$ | $d_7 = 1.4700$ | | |
| $r_8 = -447.6320$ | $d_8 = 3.1400$ | $n_{d4} = 1.60311$ | $\nu_{d4} = 60.70$ |
| $r_9 = -11.5600$ (Aspheric) | $d_9 = $ (Variable) | | |
| $r_{10} = -13.5480$ (Aspheric) | $d_{10} = 1.7100$ | $n_{d5} = 1.52310$ | $\nu_{d5} = 50.84$ |
| $r_{11} = 194.7290$ | | | |

Zooming Specs

| f | 28 | 39.6 | 56 |
|---|---|---|---|
| $d_4$ | 2.757 | 7.569 | 11.468 |
| $d_9$ | 10.363 | 5.551 | 1.652 |

Aspherical Coefficients

9th surface
$A_4 = 0.94515 \times 10^{-4}$
$A_6 = 0.84363 \times 10^{-7}$
$A_8 = 0.90888 \times 10^{-8}$
$A_{10} = 0.13164 \times 10^{-9}$ 10th surface
$A_4 = 0.80318 \times 10^{-4}$
$A_6 = 0.21879 \times 10^{-6}$
$A_8 = 0.21621 \times 10^{-9}$
$A_{10} = 0$

EXAMPLE 2

$f = 35 \sim 49.5 \sim 70$
$F_{NO} = 4.60 \sim 5.93 \sim 7.73$
$\omega = 31.7 \sim 23.6 \sim 17.2°$
$f_B = 9.42 \sim 19.89 \sim 34.32$

| | | | |
|---|---|---|---|
| $r_1 = 12.8210$ | $d_1 = 1.2000$ | $n_{d1} = 1.84666$ | $\nu_{d1} = 23.78$ |
| $r_2 = 10.3760$ | $d_2 = 1.0000$ | | |
| $r_3 = 10.5650$ | $d_3 = 3.0000$ | $n_{d2} = 1.48749$ | $\nu_{d2} = 70.20$ |
| $r_4 = 28.0540$ | $d_4 = $ (Variable) | | |
| $r_5 = \infty$ (Stop) | $d_5 = 1.9000$ | | |
| $r_6 = -9.1510$ | $d_6 = 1.0000$ | $n_{d3} = 1.78590$ | $\nu_{d3} = 44.18$ |
| $r_7 = -10.8120$ | $d_7 = 2.9000$ | | |
| $r_8 = 127.1230$ | $d_8 = 3.3100$ | $n_{d4} = 1.51633$ | $\nu_{d4} = 64.15$ |
| $r_9 = -13.4370$ (Aspheric) | $d_9 = $ (Variable) | | |
| $r_{10} = -12.1640$ (Aspheric) | $d_{10} = 1.7000$ | $n_{d5} = 1.56873$ | $\nu_{d5} = 63.16$ |
| $r_{11} = -1000.0000$ | | | |

Zooming Specs

| f | 35 | 49.5 | 70 |
|---|---|---|---|
| $d_4$ | 2.990 | 7.305 | 10.750 |
| $d_9$ | 11.800 | 7.485 | 4.040 |

Aspherical Coefficients

9th surface
$A_4 = 0.10274 \times 10^{-3}$
$A_6 = 0.13034 \times 10^{-5}$
$A_8 = 0.56074 \times 10^{-7}$
$A_{10} = 0.10698 \times 10^{-9}$ 10th surface
$A_4 = 0.10698 \times 10^{-3}$
$A_6 = 0.17052 \times 10^{-6}$
$A_8 = 0.40854 \times 10^{-8}$
$A_{10} = 0$

EXAMPLE 3

$f = 40 \sim 49 \sim 60$
$F_{NO} = 5.60 \sim 6.31 \sim 7.11$
$\omega = 28.4 \sim 23.8 \sim 19.8°$
$f_B = 10.82 \sim 17.08 \sim 24.46$

| | | | |
|---|---|---|---|
| $r_1 = 14.2360$ | $d_1 = 1.2000$ | $n_{d1} = 1.84666$ | $\nu_{d1} = 23.78$ |
| $r_2 = 11.2040$ | $d_2 = 0.7500$ | | |
| $r_3 = 11.7480$ (Aspheric) | $d_3 = 4.2100$ | $n_{d2} = 1.56873$ | $\nu_{d2} = 63.16$ |
| $r_4 = 32.3580$ | $d_4 = $ (Variable) | | |
| $r_5 = \infty$ (Stop) | $d_5 = 8.1600$ | | |
| $r_6 = -151.8320$ | $d_6 = 2.4800$ | $n_{d3} = 1.65160$ | $\nu_{d3} = 58.52$ |
| $r_7 = -19.6700$ (Aspheric) | $d_7 = $ (Variable) | | |
| $r_8 = -12.6300$ (Aspheric) | $d_8 = 1.6000$ | $n_{d4} = 1.55232$ | $\nu_{d4} = 63.75$ |
| $r_9 = -92.2570$ | | | |

Zooming Specs

| f | 40 | 49 | 60 |
|---|---|---|---|
| $d_4$ | 4.516 | 8.026 | 11.213 |
| $d_7$ | 9.084 | 5.574 | 2.387 |

Aspherical Coefficients third surface
第3面
$A_4 = -0.51487 \times 10^{-5}$
$A_6 = 0.72698 \times 10^{-8}$
$A_8 = 0.87214 \times 10^{-10}$
$A_{10} = 0$ 7th surface
$A_4 = 0.79969 \times 10^{-4}$
$A_6 = -0.11419 \times 10^{-5}$
$A_8 = 0.18067 \times 10^{-7}$
$A_{10} = -0.11786 \times 10^{-9}$ 8th surface
$A_4 = 0.14016 \times 10^{-3}$
$A_6 = 0.56948 \times 10^{-6}$
$A_8 = 0.50224 \times 10^{-8}$
$A_{10} = 0$

EXAMPLE 4

| | f = 40~49~60 | | |
|---|---|---|---|
| | $F_{NO}$ = 5.60~6.19~6.81 | | |
| | ω = 28.4~23.8~19.8° | | |
| | $f_B$ = 10.87~16.59~23.23 | | |
| $r_1$ = 13.6680 (Aspheric) | $d_1$ = 1.0000 | $n_{d1}$ = 1.84666 | $ν_{d1}$ = 23.78 |
| $r_2$ = 10.9680 | $d_2$ = 0.5000 | | |
| $r_3$ = 11.0470 | $d_3$ = 3.8000 | $n_{d2}$ = 1.51728 | $ν_{d2}$ = 69.56 |
| $r_4$ = 44.4210 | $d_4$ = (Variable) | | |
| $r_5$ = ∞ (Stop) | $d_5$ = 6.3000 | | |
| $r_6$ = −56.9040 | $d_6$ = 4.3000 | $n_{d3}$ = 1.72916 | $ν_{d3}$ = 54.68 |
| $r_7$ = −19.7060 (Aspheric) | $d_7$ = (Variable) | | |
| $r_8$ = −12.2530 | $d_8$ = 1.5000 | $n_{d4}$ = 1.61700 | $ν_{d4}$ = 62.79 |
| $r_9$ = −73.9600 (Aspheric) | | | |

| Zooming Speces | | | |
|---|---|---|---|
| f | 40 | 49 | 60 |
| $d_4$ | 3.426 | 6.976 | 10.286 |
| $d_7$ | 9.174 | 5.624 | 2.314 |

Aspherical Coefficients first surface

Figure 5:
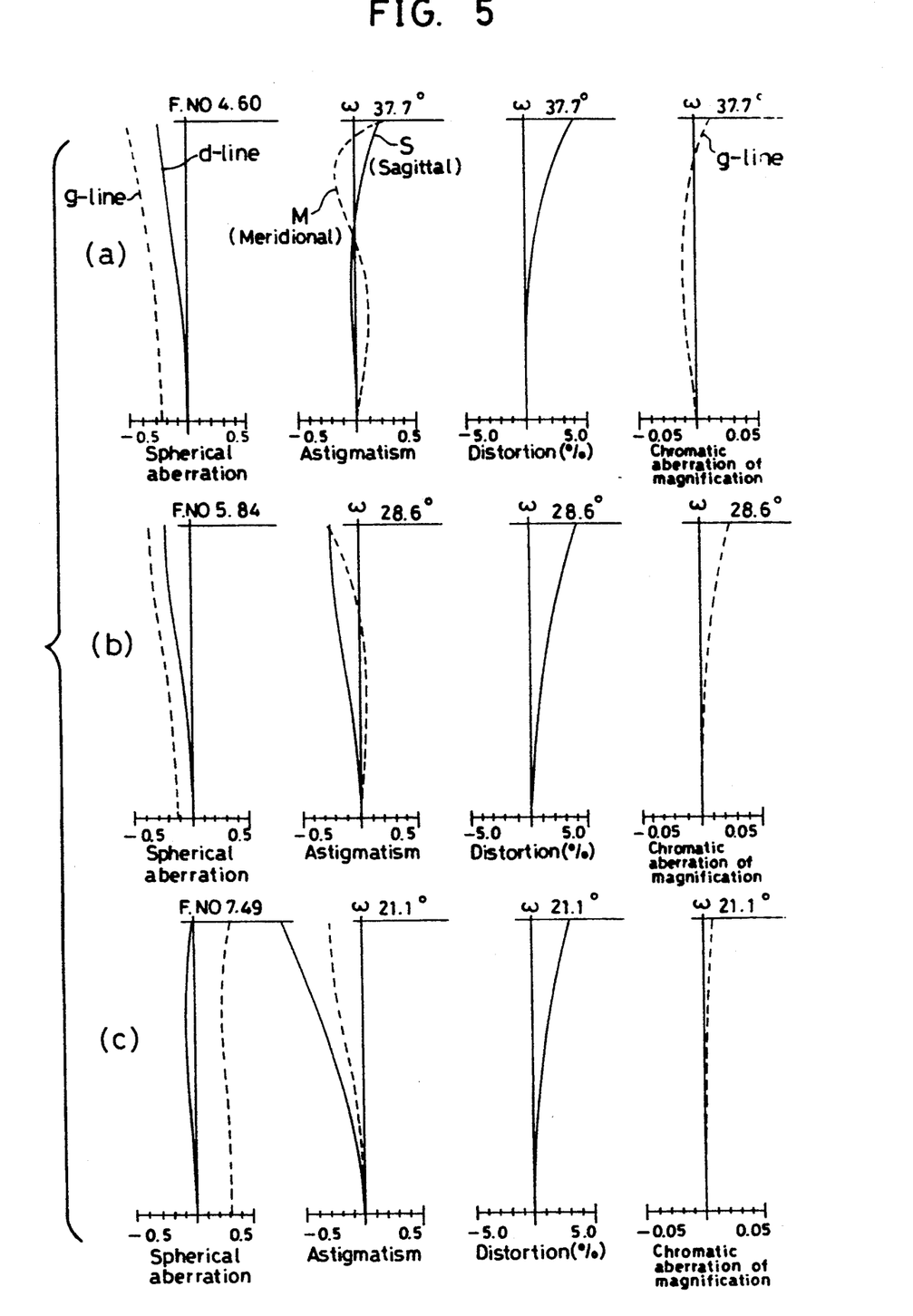
FIG. 5 is aberration diagrams showing the spherical aberration, astigmatism, distortion and chromatic aberration of magnification of the zoom lens system of Ex. 1 at the (a) wide, (b) standard and (c) tele positions.
Figure 6:
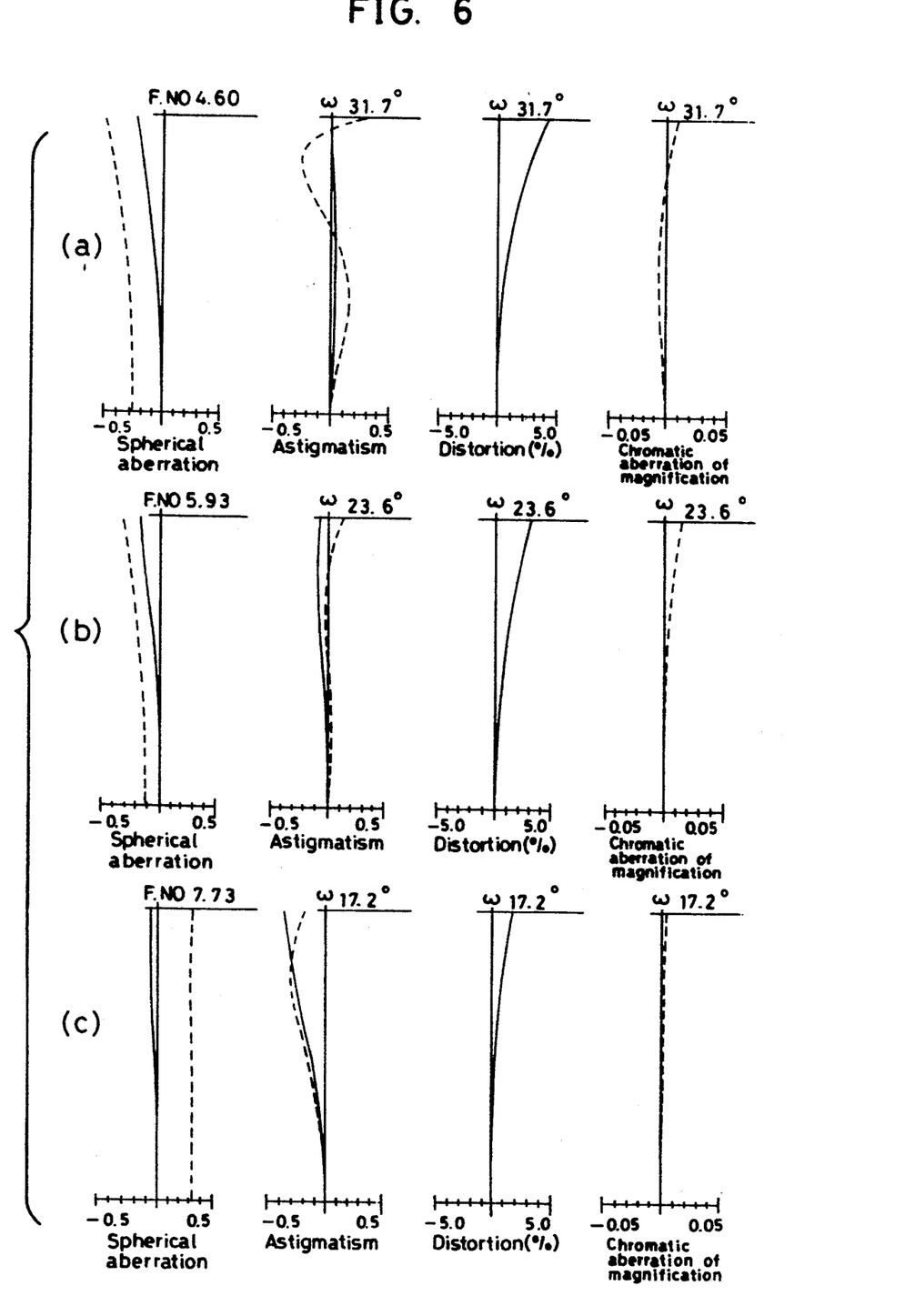
FIGS. 6–8 are aberration diagrams of Examples 2–4, similar to FIG. 5.
Figure 7:
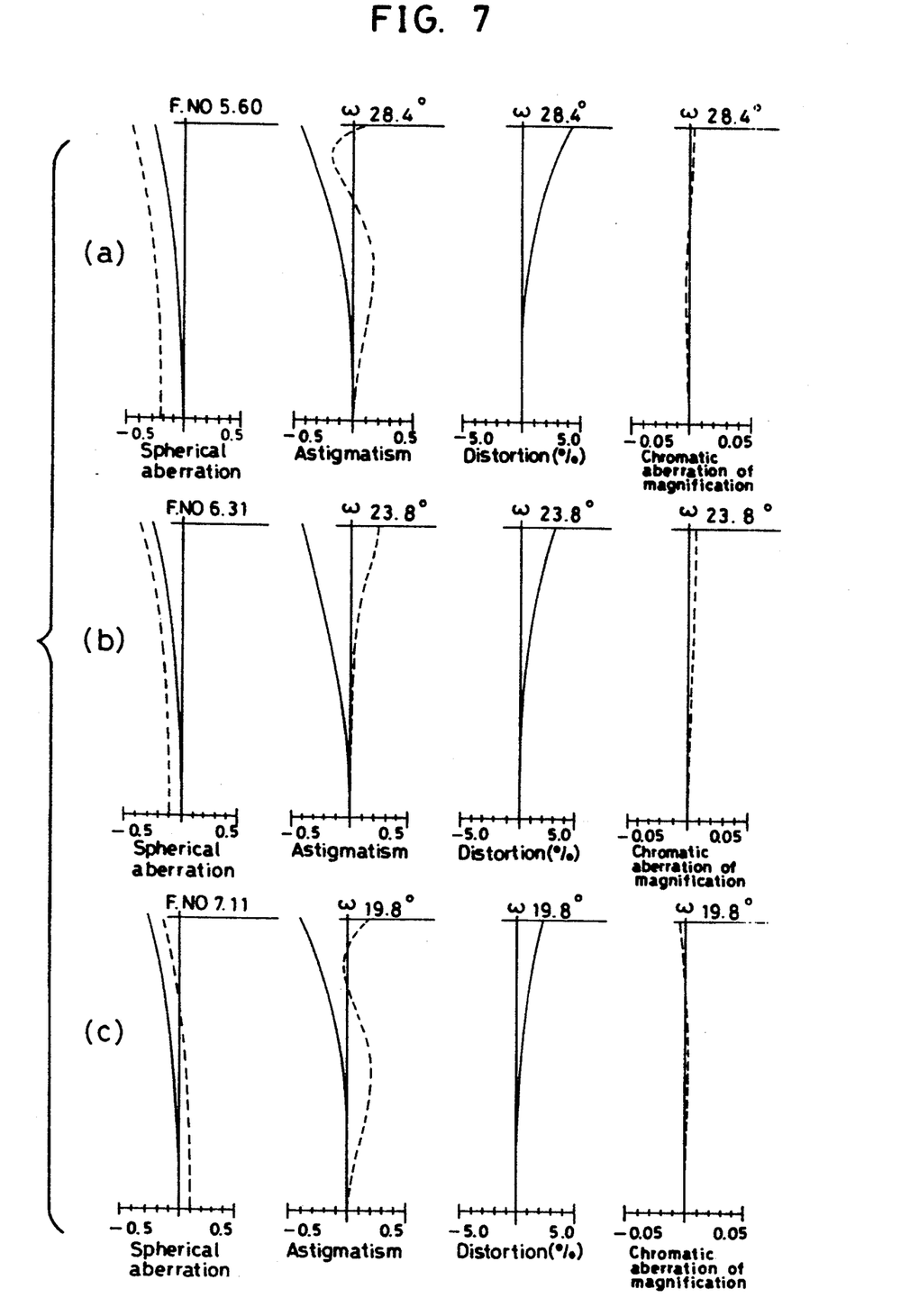
Figure 8:
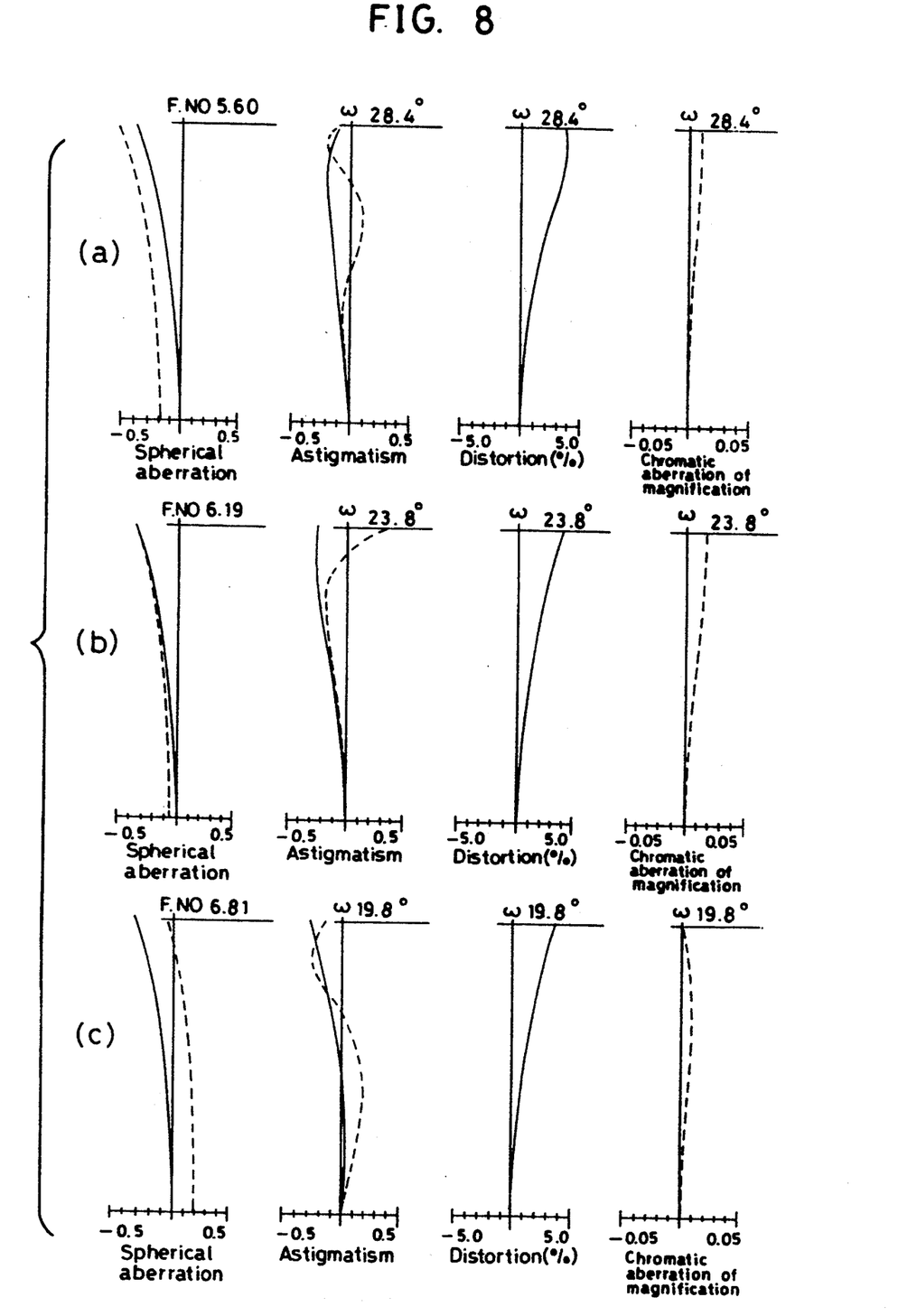

第1面
$A_4 = -0.53106 \times 10^{-5}$
$A_6 = -0.13478 \times 10^{-8}$
$A_8 = -0.28637 \times 10^{-9}$
$A_{10} = 0$ 7th surface
$A_4 = 0.56674 \times 10^{-4}$
$A_6 = -0.10540 \times 10^{-6}$
$A_8 = -0.13935 \times 10^{-7}$
$A_{10} = 0.26816 \times 10^{-9}$ 9th surface
$A_4 = -0.84157 \times 10^{-4}$
$A_6 = 0.38696 \times 10^{-6}$
$A_8 = -0.13958 \times 10^{-8}$
$A_{10} = 0$ The spherical aberrations, astigmatisms, distortions and chromatic aberrations of magnifications of Example 1–4 at the (a) wide, (b) standard and (c) tele positions are shown in the aberration diagrams of FIGS. 5–8.

Set out below are the values of the conditional formulae (1)–(5) in Examples 1–4.

| | Example 1 | Example 2 | Example 3 | Example 4 |
|---|---|---|---|---|
| (1) | 0.86 | 0.62 | 0.67 | 0.60 |
| (2) | 1.36 | 1.49 | 1.45 | 1.50 |
| (3) | 0.79 | 0.78 | 0.86 | 0.99 |
| (4) | 1.05 | 0.81 | 1.30 | 2.06 |
| (5) | 0.15 | 0.17 | 0.20 | 0.16 |

As explained above, by conforming to the conditions defined by this invention, it is possible to obtain a compact zoom lens system comprising 4 or 5 lenses, which has a zoom ratio of 1.5 to 2 and is of high performance, albeit compact.

The zoom lens system of this invention lends itself well fit for lens shutter cameras, etc.

What we claim is:

1. A zoom lens system comprising in order from the object side;
    a first lens unit consisting of a negative meniscus lens convex on the object side and a positive meniscus lens convex on the object side and having a positive refracting power as a whole,
    a second lens unit including one positive lens, or one negative lens and one positive lens, and having a positive refracting power as a whole, and
    a third lens unit consisting of one negative lens,
    said first and second lens units being movable toward each other for zooming from the wide to tele position.

2. A zoom lens system as claimed in claim 1, wherein an aspherical surface is incorporated in said second lens unit.

3. A zoom lens system as claimed in claim 1, wherein an aspherical surface is incorporated in said third lens unit.

4. A zoom lens system as claimed in claim 1, 2 or 3, which conforms to the following conditions (1) and (2):

$$0.5 < |f_3/f_W| < 1.2, \quad (1) \text{ and}$$

$$1.2 < \beta_{3W} < 1.8, \quad (2)$$

where
$f_W$ is the focal length of the total system at the wide position,
$f_3$ is the focal length of said third lens unit, and
$\beta_{3W}$ is the image-formation magnification of said third lens unit at the wide position.

5. A zoom lens system as claimed in claim 1, 2 or 3, which conforms to the following condition (3):

$$0.5 < f_2/f_W < 1.3, \quad (3)$$

where
$f_W$ is the focal length of the total system at the wide position, and
$f_2$ is the focal length of said second lens unit.

6. A zoom lens system as claimed in claim 4, which conforms to the following condition (4):

$$0.5 < f_2/f_W < 1.3, \quad (4)$$

where
$f_W$ is the focal length of the total system at the wide position, and
$f_2$ is the focal length of said second lens unit.

7. A zoom lens system as claimed in claim 1, 2 or 3, which conforms to the following conditions (5) and (6):

$$0.7 < (r_a + r_b)/(r_a - r_b) < 3, \quad (5) \text{ and}$$

$$0.12 < L/f_W < 0.3, \quad (6)$$

where
$r_a$ and $r_b$ are the object- and image-side radii of curvature of the positive lens in said second lens unit, respectively, and
L is the distance of said second lens from the stop to the object side of the positive lens.

8. A zoom lens system as claimed in claim 1, wherein said second and third lens units are movable to decrease a separation between said second and third lens units for zooming from the wide to tele position.

9. A zoom lens system comprising in order from the object side:
    a first lens unit consisting of a negative meniscus lens convex on the object side and a positive meniscus lens convex on the object side and having a positive refracting power as a whole,
    a second lens unit consisting of one positive lens, and having a positive refracting power as a whole, and a third lens unit consisting of one negative lens, said first and second lens units being movable to increase a separation between said first and second lens units for zooming from the wide to tele position.

10. A zoom lens system as claimed in claim 9, wherein an aspherical surface is incorporated in said second lens unit.

11. A zoom lens system as claimed in claim 9, wherein an aspherical surface is incorporated in said third lens unit.

12. A zoom lens system as claimed in claim 9, 10 or 11, which conforms to the following conditions (1) and (2):

$$0.5 < |f_3/f_W| < 1.2, \tag{1}$$

$$1.2 < \beta_{3W} < 1.8 \tag{2}$$

where
  $f_W$ is the focal length of the total system at the wide position,
  $f_3$ is the focal length of said third lens unit, and
  $\beta_{3W}$ is the image-formation magnification of said third lens unit at the wide position.

13. A zoom lens system as claimed in claim 9, 10 or 11, which conforms to the following condition (3):

$$0.5 < f_2/f_W < 1.3 \tag{3}$$

where
  $f_W$ is the focal length of the total system at the wide position, and
  $f_2$ is the focal length of said second lens unit.

14. A zoom lens system as claimed in claim 12, which conforms to the following condition (4):

$$0.5 < f_2/f_W < 1.3 \tag{4}$$

where
  $f_W$ is the focal length of the total system at the wide position, and
  $f_2$ is the focal length of said second lens unit.

15. A zoom lens system as claimed in claim 9, 10 or 11, which conforms to the following conditions (5) and (6):

$$0.7 < (r_a + r_b)/(r_a - r_b) < 3 \tag{5}$$

$$0.12 < L/f_W < 0.3 \tag{6}$$

where
  $r_a$ and $r_b$ are the object- and image-side radii of curvature of the positive lens in said second lens unit, respectively, and
  L is the distance of said second lens unit from the stop to the object side of the positive lens.

16. A zoom lens system comprising in order from the object side:
  a first lens unit consisting of a negative meniscus lens convex on the object side and a positive meniscus lens convex on the object side and having a positive refracting power as a whole,
  a second lens unit consisting of one negative lens and one positive lens, and having a positive refracting power as a whole, and
  a third lens unit consisting of one negative lens,
  said first and second lens units being movable to increase a separation between said first and second lens units for zooming from the wide to tele position.

17. A zoom lens system as claimed in claim 16, wherein an aspherical surface is incorporated in said second lens unit.

18. A zoom lens system as claimed in claim 16, wherein an aspherical surface is incorporated in said third lens unit.

19. A zoom lens system as claimed in claim 16, 17 or 18, which conforms to the following conditions (1) and (2):

$$0.5 < |f_3/f_W| < 1.2, \tag{1}$$

$$1.2 < \beta_{3W} < 1.8 \tag{2}$$

where
  $f_W$ is the focal length of the total system at the wide position,
  $f_3$ is the focal length of said third lens unit, and
  $\beta_{3W}$ is the image-formation magnification of said third lens unit at the wide position.

20. A zoom lens system as claimed in claim 16, 17 or 18, which conforms to the following condition (3):

$$0.5 < f_2/f_W < 1.3 \tag{3}$$

where
  $f_W$ is the focal length of the total system at the wide position, and
  $f_2$ is the focal length of said second lens unit.

21. A zoom lens system as claimed in claim 19, which conforms to the following condition (4):

$$0.5 < f_2/f_W < 1.3 \tag{4}$$

where
  $f_W$ is the focal length of the total system at the wide position, and
  $f_2$ is the focal length of said second lens unit.

22. A zoom lens system as claimed in claim 16, 17 or 18, which conforms to the following conditions (5) and (6):

$$0.7 < (r_a + r_b)/(r_a - r_b) < 3 \tag{5}$$

$$0.12 < L/f_W < 0.3 \tag{6}$$

where
  $r_a$ and $r_b$ are the object- and image-side radii of curvature of the positive lens in said second lens unit, respectively, and
  L is the distance of said second lens unit from the stop to the object side of the positive lens.

* * * * *